United States Patent
Ridenour

(10) Patent No.: US 11,049,407 B2
(45) Date of Patent: Jun. 29, 2021

(54) SYSTEMS AND METHODS FOR CONFLICT DETECTION USING POSITION UNCERTAINTY

(71) Applicant: AVIATION COMMUNICATION & SURVEILLANCE SYSTEMS, LLC, Phoenix, AZ (US)

(72) Inventor: Richard D. Ridenour, Peoria, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 0 days.

(21) Appl. No.: 16/740,904

(22) Filed: Jan. 13, 2020

(65) Prior Publication Data
US 2020/0184837 A1    Jun. 11, 2020

Related U.S. Application Data

(60) Division of application No. 12/535,208, filed on Aug. 4, 2009, now Pat. No. 10,535,275, which is a continuation-in-part of application No. 13/095,801, filed on Apr. 27, 2011, now Pat. No. 9,842,506.

(60) Provisional application No. 61/166,172, filed on Apr. 2, 2009, provisional application No. 61/086,043, filed on Aug. 4, 2008, provisional application No. 61/328,538, filed on Apr. 27, 2010.

(51) Int. Cl.
G08G 5/06    (2006.01)
G08G 5/04    (2006.01)
G01S 13/78    (2006.01)

(52) U.S. Cl.
CPC ............ G08G 5/06 (2013.01); G08G 5/045 (2013.01); G01S 13/781 (2013.01)

(58) Field of Classification Search
CPC .................................................... G08G 5/045
See application file for complete search history.

(56) References Cited

U.S. PATENT DOCUMENTS

| | | | | |
|---|---|---|---|---|
| 2002/0154061 A1* | 10/2002 | Frazier, Jr. | ............ | G01C 23/00 342/455 |
| 2003/0122701 A1* | 7/2003 | Tran | ..................... | G08G 5/0008 342/29 |
| 2006/0041381 A1* | 2/2006 | Simon | ..................... | G08G 1/166 701/301 |
| 2007/0078592 A1* | 4/2007 | Meunier | .............. | G08G 5/0082 701/120 |
| 2008/0195301 A1* | 8/2008 | Fabre | ..................... | G08G 5/065 701/120 |
| 2008/0249669 A1* | 10/2008 | Skarman | .............. | G08G 5/0078 701/3 |

* cited by examiner

*Primary Examiner* — Imran K Mustafa
(74) *Attorney, Agent, or Firm* — Dickinson Wright PLLC

(57) ABSTRACT

A method according to the present invention includes calculating, based on a reported position of a vehicle, a probability that an actual position of the vehicle is within a region of interest. The method further includes determining whether a threat of a collision exists between the vehicle and an object based on the probability that the actual position of the vehicle is within the region of interest and a reported position of the object. The method further includes generating an alert if it is determined a threat of a collision exists between the vehicle and the object.

21 Claims, 16 Drawing Sheets

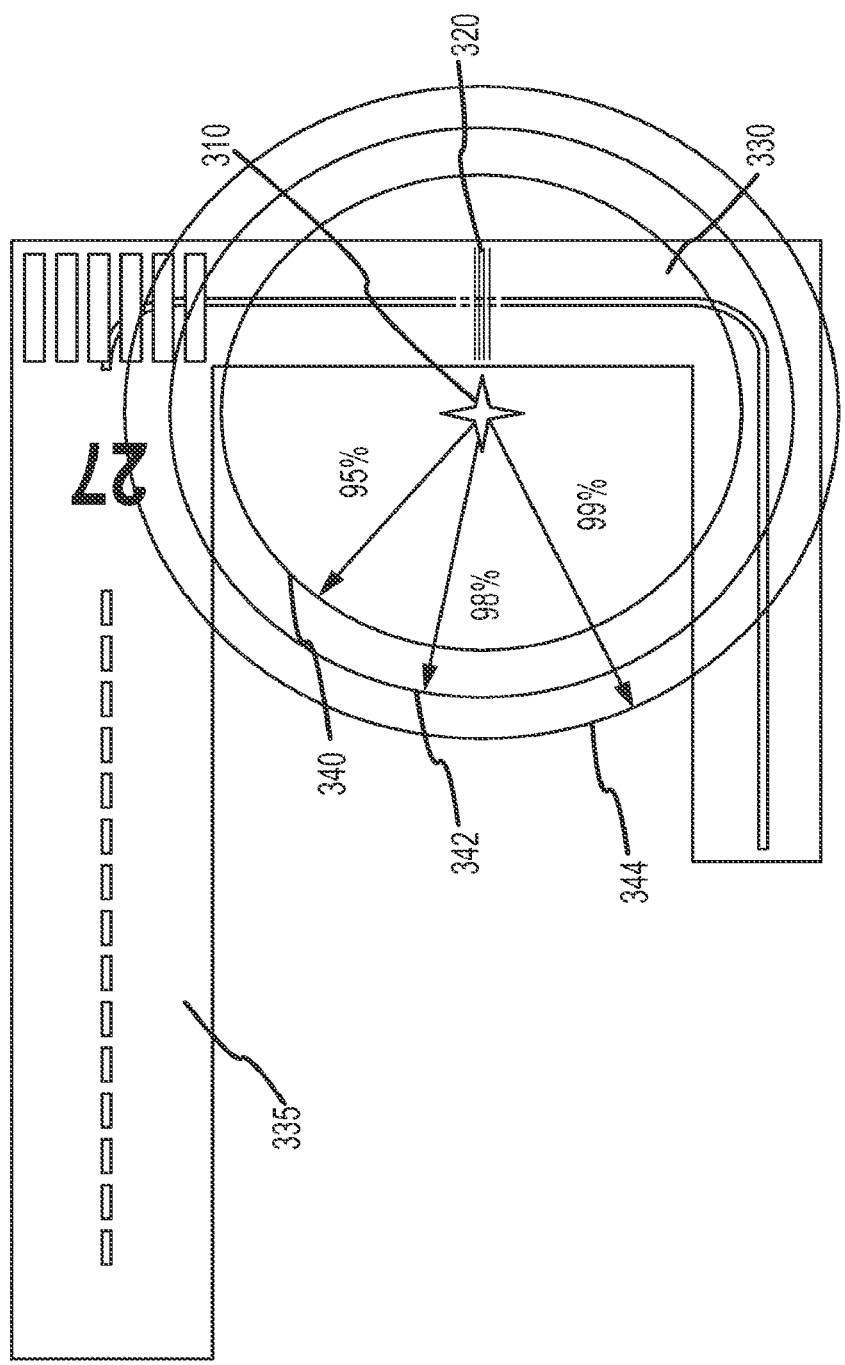

SYSTEMS AND METHODS FOR CONFLICT DETECTION USING POSITION UNCERTAINTY

CROSS-REFERENCE TO RELATED APPLICATION

This application is a divisional of and claims priority to U.S. patent application Ser. No. 12/535,208, filed Aug. 4, 2009, which claims priority to U.S. Provisional Patent Application Ser. No. 61/086,043, filed Aug. 4, 2008, and to U.S. Provisional Patent Application Ser. No. 61/166,172, filed Apr. 2, 2009. U.S. patent application Ser. No. 13/095,801, filed Apr. 27, 2011 (Now U.S. Pat. No. 9,842,506) is a continuation-in-part of U.S. patent application Ser. No. 12/535,208, filed Aug. 4, 2009. U.S. patent application Ser. No. 13/095,801, filed Apr. 27, 2011 (Now U.S. Pat. No. 9,842,506), claims priority to U.S. Provisional Patent Application Ser. No. 61/328,538, filed Apr. 27, 2010, the disclosures of each of the foregoing being incorporated by reference in their entirety. The present application also claims priority to U.S. patent application Ser. No. 13/095,801, filed Apr. 27, 2011 (Now U.S. Pat. No. 9,842,506) and to U.S. Provisional Patent Application Ser. No. 61/328,538, filed Apr. 27, 2010.

DESCRIPTION OF THE INVENTION

Field of the Invention

The present invention relates to systems and methods for conflict detection using position uncertainty, and, in particular, to safety alerting for vehicles, such as aircraft, using position uncertainty.

Background of the Invention

The current high volume of air vehicle traffic at airports around the world creates the potential for collisions between a multitude of aircraft taking off from, or landing on, relatively few runways. Determining the occupancy and usage of these runways to prevent high-speed collisions is often difficult. Similar issues exist in other situations where multiple vehicles, whether travelling by land, sea, or air, operate in the same areas and/or travel along the same routes.

Some aircraft are equipped with Automatic Dependent System Broadcast (ADS-B) systems that automatically and repeatedly broadcast the aircraft's position, velocity, flight identification, and other parameters. Aircraft with ADS-B systems are generally equipped with Global Positioning Systems (GPS) to allow the aircraft to determine and broadcast its position accurately. The United States Federal Aviation Administration (FAA) has proposed that ADS-B systems must be included on all aircraft by 2020 to allow the position and movement of aircraft to be tracked in order to help avoid collisions at an airport or other location.

The accuracy of aircraft navigation systems improves over time, but the amount of error between the aircraft's actual position and the position reported by an aircraft navigation system can be significant in a variety of situations, such as in comparison to the separation between runways and hold lines. There is always some measure of error between what the GPS, Flight Management System (FMS), or other navigation sensor calculates and the true position of the vehicle. Due to this error, the reported position of a vehicle could be on the runway even though the vehicle is, in fact, stopped safely short of the hold line and not on the runway.

Conventional conflict detection systems may not account for position inaccuracies that are inherent to the aircraft positioning systems providing the reported position/velocity of the aircraft. Additionally, the positioning systems, and their associated level of error/uncertainty, vary from aircraft to aircraft. Often, the magnitude of these position uncertainties are significant with respect to typical distances between "safe" and "unsafe" locations on the airport surface. This uncertainty may exist not only with own ship position, but also with the reported position of other aircraft in the vicinity that could potentially conflict with own ship.

Conventional alerting systems issue alerts based on the reported position of the aircraft and/or a projection the aircraft's position based on its reported velocity (i.e., they treat the reported position of the aircraft as its actual position). Unfortunately, these systems are prone to nuisance alerts. These nuisance alerts can result in pilots rejecting a takeoff (which requires abnormal braking and results in disrupted airport operations, flight delays, and potential passenger injury). Such nuisance alerts may also result in pilots rejecting a landing, which requires a go around maneuver and results in disrupted airport operations, extra fuel consumption and flight delays. These and other issues are addressed by the present invention.

SUMMARY OF THE INVENTION

A method according to the present invention includes calculating, based on a reported position of a vehicle, a probability that the actual position of the vehicle is within a region of interest. The method further includes determining whether a threat of a collision exists between the vehicle and an object based on the probability that the actual position of the vehicle is within the region of interest and the reported position of the object. The method further includes generating an alert if it is determined a threat of a collision exists between the vehicle and the object.

A system according to aspects of the present invention includes a processor and a memory coupled to the processor. The processor executes instructions stored in the memory to calculate, based on the reported position of a vehicle, a probability that an actual position of the vehicle is within a region of interest. The memory further stores instructions to cause the processor to determine whether a threat of a collision exists between the vehicle and an object based on the probability that the actual position of the vehicle is within the region of interest and the reported position of the object. The memory further stores instructions to generate an alert if it is determined a threat of a collision exists between the vehicle and the object. The system may further include a data receiver to receive information (such as the reported position of the vehicle), as well as a user interface to provide the alert to a user.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

FIGS. 3A and 3B depict circular, two-dimensional distribution of positional errors around a reported position of an aircraft on a taxiway.

DESCRIPTION OF THE EMBODIMENTS

Reference will now be made in detail to the present exemplary embodiments of the invention, examples of which are illustrated in the accompanying drawings.

Exemplary System

Figure 1:
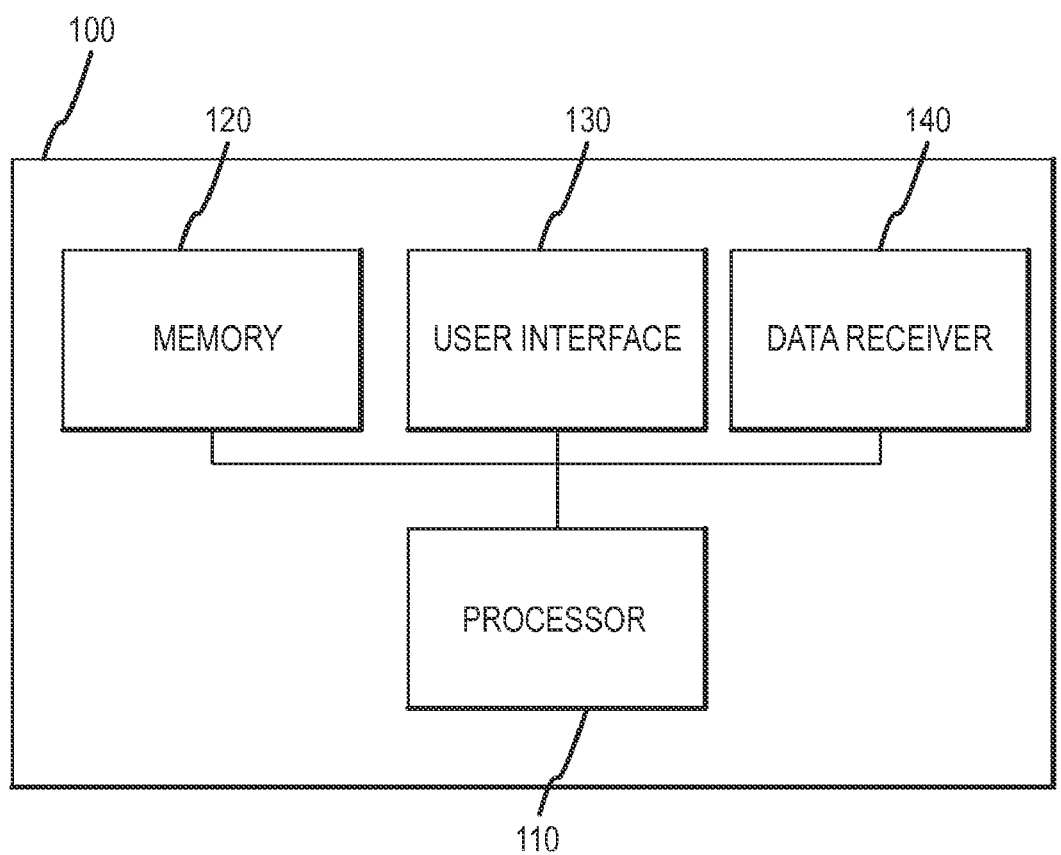
FIG. 1 is a block diagram of an exemplary system according to various aspects of the present invention.

FIG. 1 depicts an exemplary system according to various aspects of the present invention. The system 100 includes a processor 110 in communication with a memory 120, a user interface 130, and a data receiver 140. The data receiver 140 may receive data through a wired connection or through one or more antennas (not shown). The data receiver 140 may comprise a separate receiver, or be combined with a transmitter (i.e., a transceiver), and may receive electrical signals, radio frequency signals, modulated light signals, sonic signals, or other signals propagated through any suitable medium. The system 100 may operate as part of, or in conjunction with, any number of other systems and devices, such as a TCAS. The components of the exemplary system 100 may be distributed across any number of different systems and devices, and need not be physically connected to each other. The system 100 may be located on board, or external to, a vehicle for which the calculation as to the probability that the actual position of the vehicle is within a region of interest is made. The components of the system 100 may communicate with each other as desired, as well as with any other system or device. The system 100 may additionally include (or communicate with) any other appropriate components.

The processor 110 retrieves and executes instructions stored in the memory 120 to control the operation of the system 100. Any number and type of processor(s) such as an integrated circuit microprocessor, microcontroller, and/or digital signal processor (DSP), can be used in conjunction with the present invention.

The memory 120 stores instructions, information received from one or more data sources, and any other suitable information. The memory 120 operating in conjunction with the present invention may include any combination of different memory storage devices, such as hard drives, random access memory (RAM), read only memory (ROM), FLASH memory, or any other type of volatile and/or non-volatile memory. Any number of memory storage devices of any size and configuration may also be used in conjunction with the present invention.

The user interface 130 receives input from, and displays output to, one or more users, such as an operator of a vehicle on which the system is located or an individual external to the vehicle, such as an air traffic controller. The user interface 130 may include any number of suitable systems or devices to display information and receive various inputs. The user interface 130 may include one or more visual displays and/or speakers to communicate information, such as an alert, to a user. A user can provide input to the user interface 130 through a mouse, touchpad, microphone, or any number of other input devices.

The data receiver 140 receives data from one or more data sources, such as an ADS-B-equipped aircraft or a groundstation. The data receiver 140 may comprise any suitable receiver and may receive data using any number of frequencies and may use any communication protocol. The data receiver 140 may receive any type of information, such as the position, velocity, or other information pertaining to an aircraft or other object.

Exemplary Method

Figure 2:
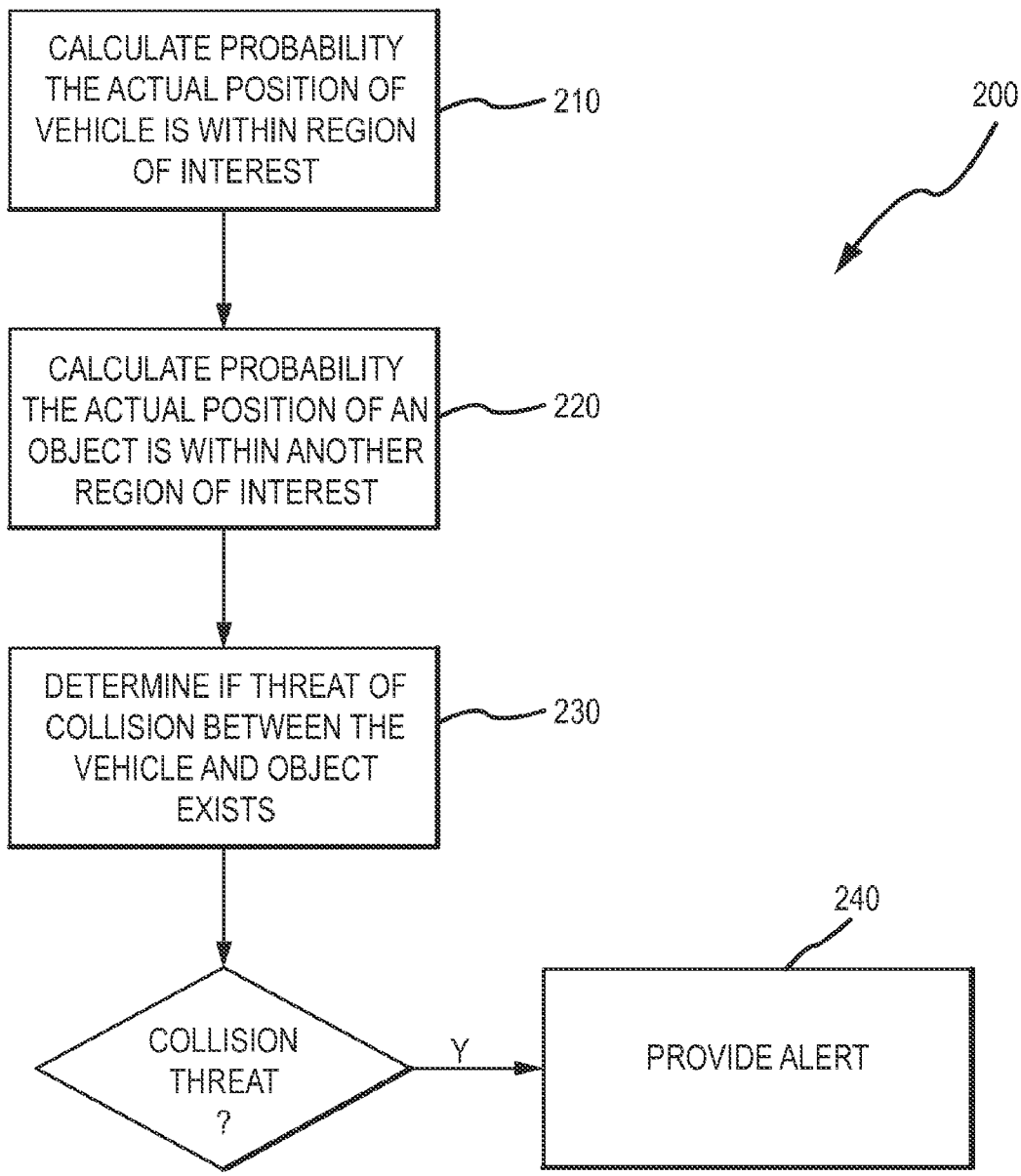
FIG. 2 is a flow diagram of an exemplary process according to various aspects of the present invention.

FIG. 2 depicts an exemplary process according to various aspects of the present invention. In this exemplary process, the probability that the actual position of a vehicle is within a region of interest is calculated based on the reported position of the vehicle (210) and the probability that the actual position of an object (such as another vehicle) is within another region of interest is calculated based on the reported position of the object (220). A determination is made as to whether a threat of collision between the vehicle and the object exists (230). If such a threat exists, an alert is provided (240).

In the exemplary process depicted in FIG. 2, information can be requested and/or received from one or more data sources, including any system, device, vehicle, or other entity capable of providing information for use with systems and methods of the present invention, including one or more systems or devices implementing methods in accordance with the present invention. Such information may be of any type and in any format, and may include, or be used to determine spatial information (e.g., bearing, range, position, velocity) for a vehicle, as well as for other purposes. For example, ADS-B transmissions containing the reported position and accuracy level of the reported position may be received from a vehicle and used to determine the probability that the vehicle is within a region of interest. Alternatively, this information may be provided by a GPS located on the vehicle to an alert system of the present invention, also located on board the vehicle.

Systems and methods of the present invention may receive information at regular intervals and/or in response to an event, regardless of whether the information has been requested. For example, systems and methods of the present invention can receive data periodically from an ADS-B-equipped system (e.g., an aircraft, ground vehicle, waterborne vehicle, or a fixed ground station). Systems and methods of the present invention can receive information (such as the reported position of a vehicle) in any manner. For example, information can be provided wirelessly from a data source to a system or device implementing methods in accordance with the present invention (such as system 100). Such information can be provided on any frequency (or combination of frequencies), in any format, and using any communication protocol. In an exemplary embodiment of the present invention, information from an ADS-B-equipped aircraft can be provided to another ADS-B-equipped aircraft via a wireless datalink. The datalink can utilize the Mode S transponder frequency (i.e. 1090 MHz) as well as any other frequency.

Figure 3A:
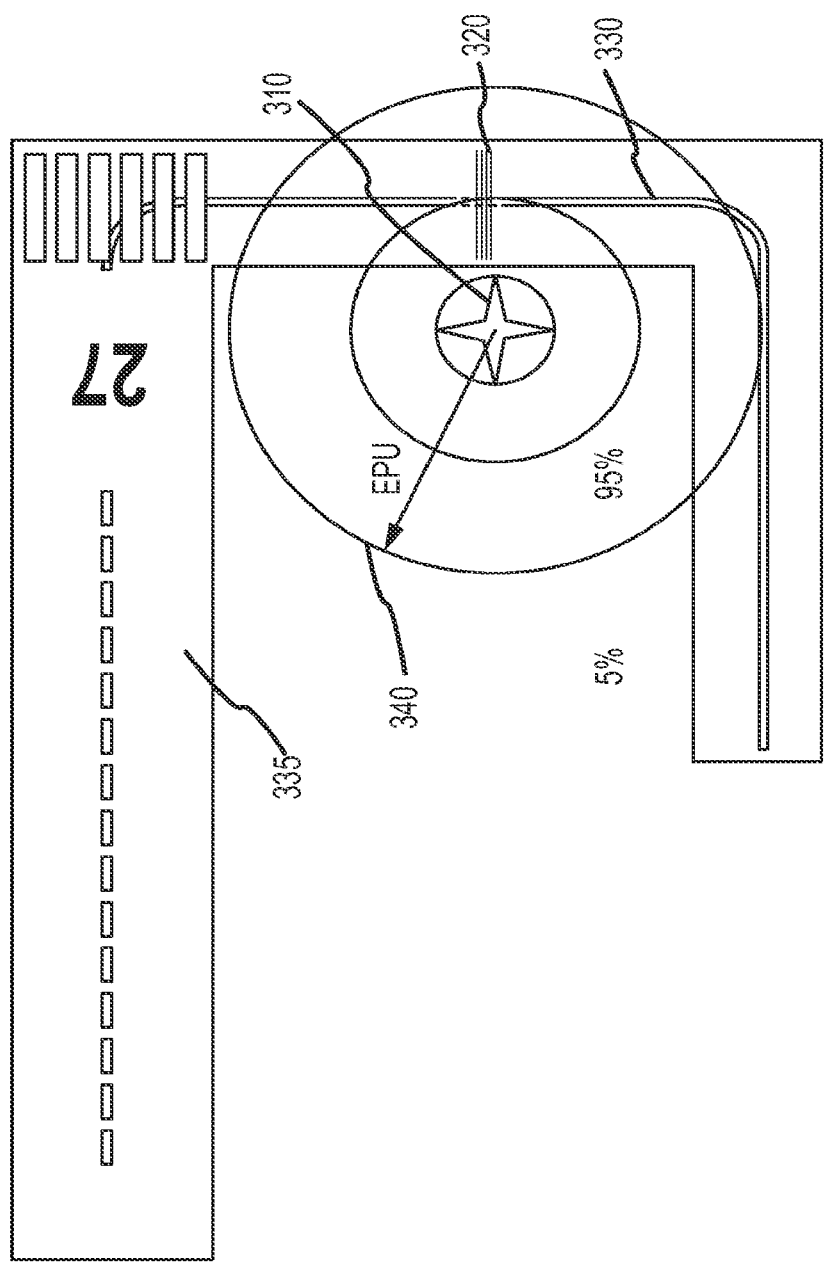

In accordance with the present invention, the probability that the actual position of a vehicle is within a region of interest is calculated based on the reported position of the vehicle. FIG. 3A illustrates the reported position of an aircraft 310 stopped near the hold line 320 on a taxiway 330 near a runway 335. In this example, the reported position 310 is determined by a Global Positioning System (GPS) and provided via an Automatic Dependent Surveillance Broadcast (ADS-B) which has an associated Navigation Accuracy Category for Position ($NAC_p$). The $NAC_p$ value defines a circle 340 around the reported position 310 with a radius (labeled "EPU" for "estimated position uncertainty"). There is a 95% probability that the actual position of the aircraft is within the circle 340, and a 5% probability that the actual position of the vehicle is outside the circle 340. Thus, the circle 340 represents a circular distribution of position errors associated with the reported position 310.

While the $NAC_p$ defines the radius of the 95% probability circle, circles corresponding to other levels of probability can be determined in accordance with the present invention. According to one aspect of the present invention, the position errors associated with the reported position 310 are modeled as bivariate normal distributions to calculate the radii of a 98% probability circle 342 and a 99% probability circle 344.

In addition to modeling position errors as described above (i.e., a circular distribution in two dimensions). Position errors for the reported position 310 may be modeled in one-dimensional distributions, two-dimensional distributions, and/or three-dimensional distributions in relation to a region of interest. A region of interest may be any size, shape, or configuration, and may include any number of possible past or future positions for a vehicle. For example, the region of interest may include a possible course of travel for a vehicle. The region of interest may be bounded by any number of dimensions, including a dimension measured from at least one of a distance from: one or more vehicles, a surface on which a vehicle is travelling, a marking, a geographical location, a structure, and/or combinations thereof.

Figure 4:
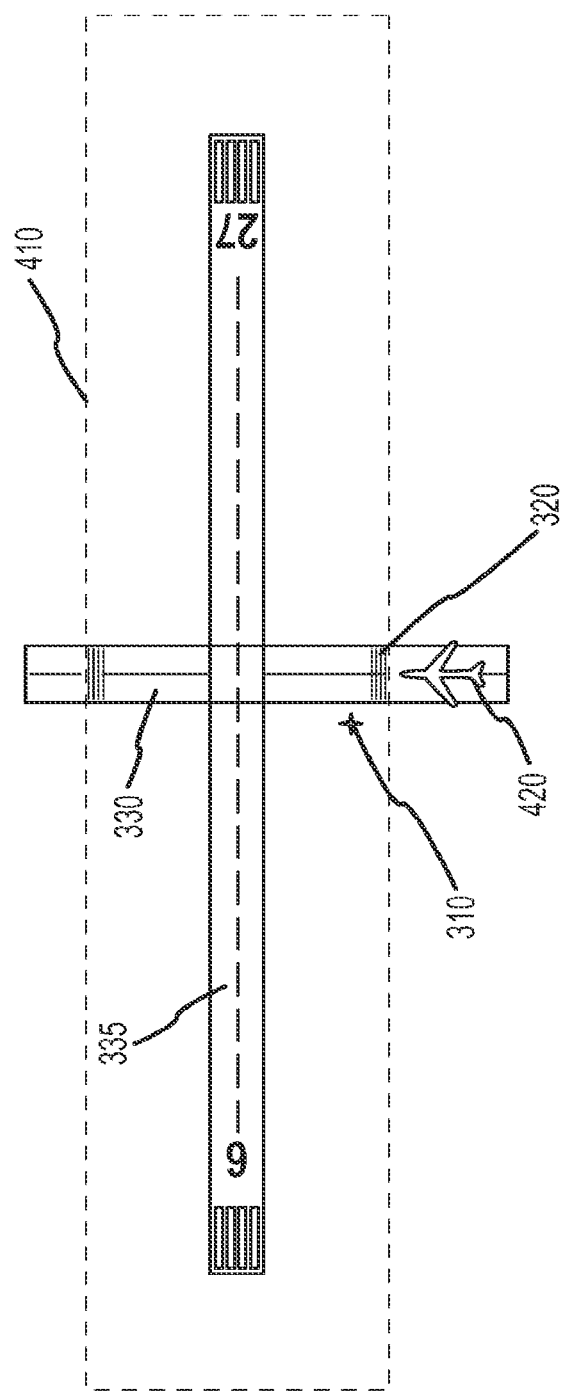
FIG. 4 illustrates a region of interest for determining the probability that an aircraft has crossed a hold line on a taxiway.

FIG. 4, for example, shows a two-dimensional, rectangular region of interest 410. In this example, an aircraft is approaching the hold line 320 on the taxiway 330. Even though the reported position of the aircraft 310 is past the hold line 320, the actual position of the aircraft 420 is ahead of the hold line 320. This situation illustrates a shortcoming of conventional alerting systems, namely that, if a second aircraft were taking off on the runway 335, an alert would be generated based on the reported aircraft position 310 being over the hold line 320, even though no alert is warranted. As discussed below, the present invention helps reduce such unwarranted alerts.

Figure 5A:
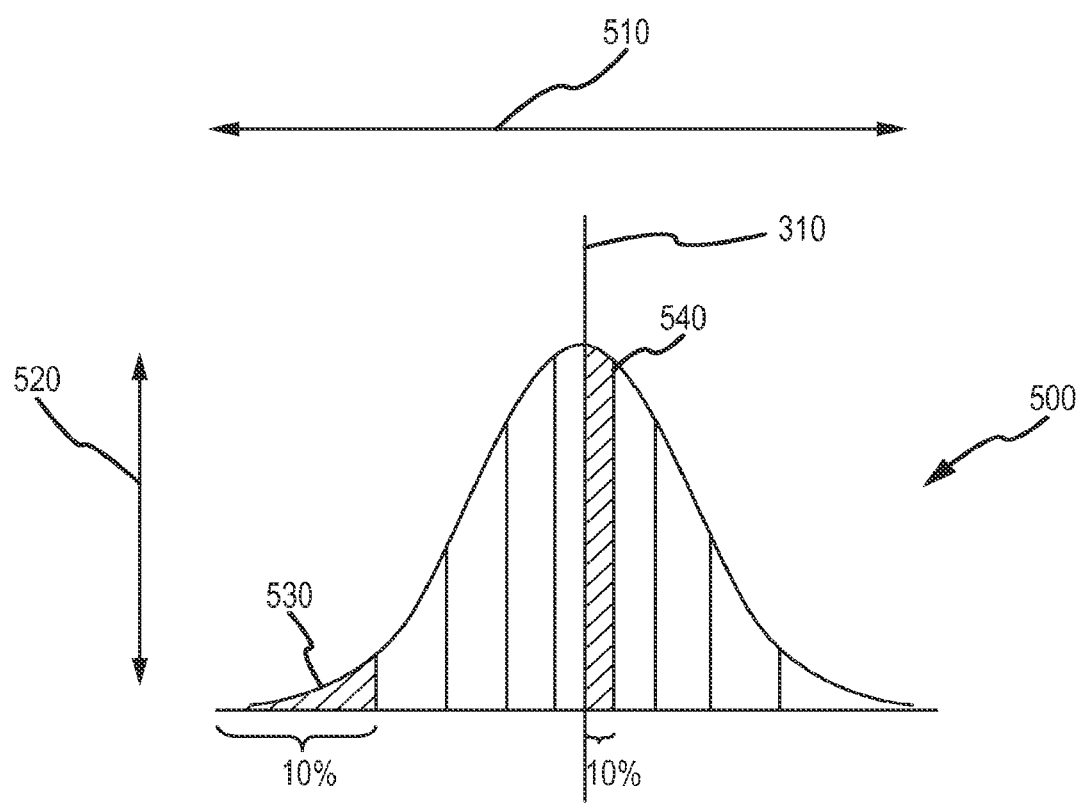
FIGS. 5A and 5B illustrate exemplary statistical probability distributions of position errors associated with the reported position of an aircraft.

FIG. 5A illustrates a typical distribution for aircraft position errors in one dimension, with the range of possible actual locations for the aircraft (510) along the horizontal axis of the curve 500 and the relative probability (520) that the reported location 310 is the actual location of the aircraft represented along the vertical axis of the curve 500. In this example, the reported aircraft position 310 is located in the center of the distribution curve 500. For each location along the curve 500, the height of the curve 500 represents the probability that the actual location is at that distance, based on the reported location 310.

In FIG. 5A, the curve 500 is symmetrical, so the probability that the actual location is left of the reported location 310 is the same as the probability that the actual location is right of the reported location 310. Additionally, the curve 500 is higher near the middle, indicating that it is more likely that the actual location is close to the reported location 310 than far from the reported location 310. A curve with the basic shape of curve 500 is referred to as a normal distribution. Error distributions in navigation systems often approximate a normal distribution, though the present invention may operate in conjunction with any type of statistical distribution.

The vertical lines in the curve in FIG. 5A divide the area under the curve 500 into ten segments of equal area. Each of the segments reflects a region which has a 10% chance of containing the actual location. The two shaded areas (530 and 540) each reflect a region of 10% probability. Area 540, nearer to the reported location 310, is narrower than area 530, which is farther from the reported location 310. This reflects that there is less probability of the actual location being at any one point that is far from the reported location 310 compared to closer to the reported location 310.

Figure 5B:
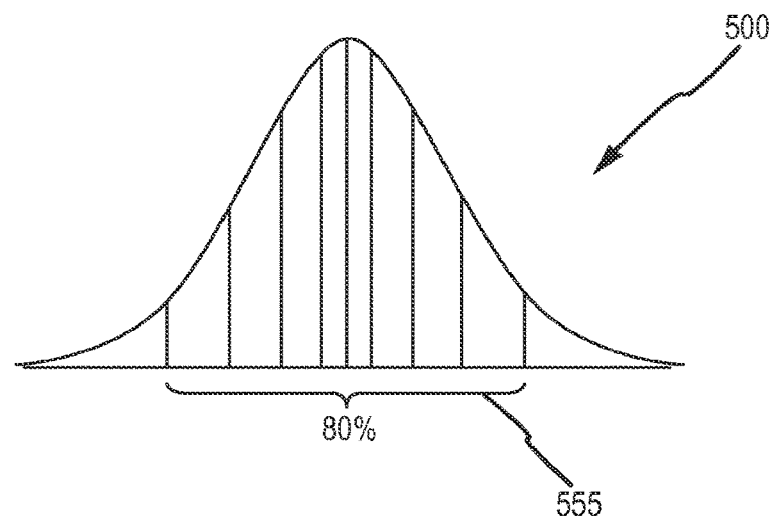
Figure 5B:
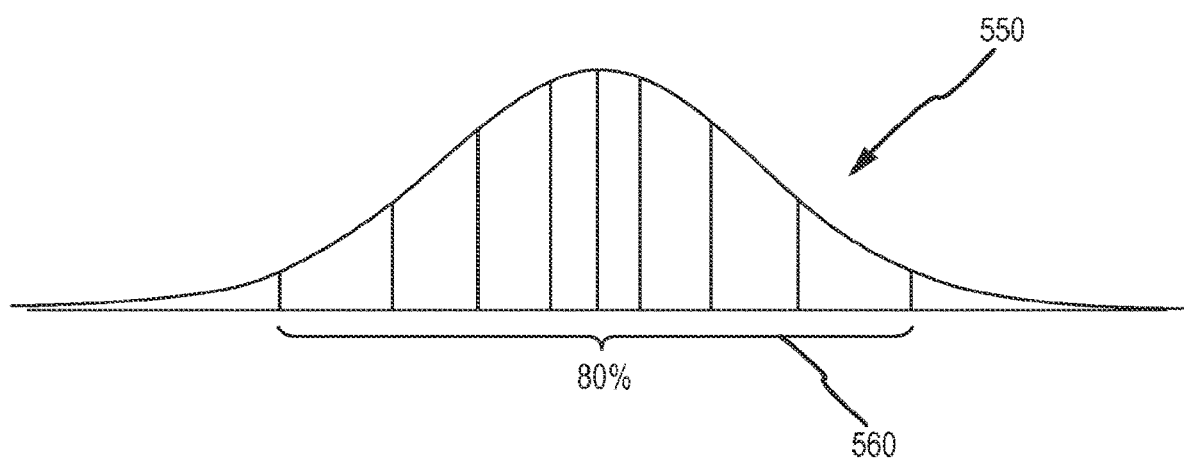

The shape of an error distribution curve for a reported location is indicative of the level of accuracy of the reported location. For example, referring to FIG. 5B, distribution curve 500 (described above) represents a reported location with relatively high accuracy, while distribution curve 550 represents a reported location with a relatively low accuracy. As a point of comparison, the range representing the middle 80% of the curve is shown for both distributions (555 and 560). It can be seen that the higher accuracy of distribution 500 results in a smaller range 555, while distribution 550 has a larger range 560.

Figure 6A:
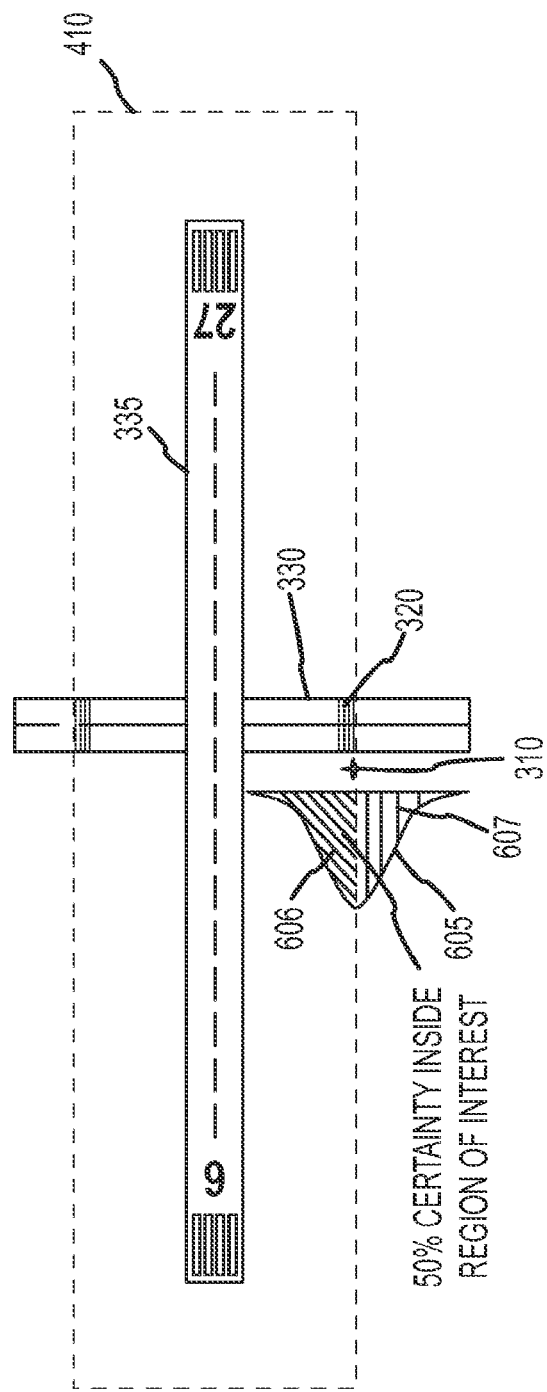
FIGS. 6A-6E illustrate the probability the actual position of an aircraft is within a region of interest based on different reported positions of the aircraft in accordance with the present invention.

The present invention can utilize the error distribution curve for a reported position to determine, to a desired level of probability, whether the actual position of the aircraft is within a region of interest. Referring now to FIG. 6A, a reported position 310 is shown next to taxiway 330. Superimposed next to the reported position 310 is a probability distribution of position errors 605 in one dimension around the reported position of an aircraft. In this case, the reported position 310 is located directly on the lower boundary of the region of interest 410, the lower boundary corresponding to the hold line 320. By symmetry, there is a 50% probability that the actual position of the aircraft is inside the region of interest 410 (represented by shaded portion 606 of the curve 605) and a 50% probability that the actual position is beyond the region of interest (represented by shaded portion 607 of the curve 605).

It should be noted that, while theoretically the probability distribution 605 extends to infinity in both directions (i.e. off the top and bottom of the page in FIG. 6A), practically, the probability that the actual location is more than a finite distance from the reported position 310 is essentially zero. This finite distance may vary depending on the accuracy of the navigation system. For simplicity, the distribution 605 depicted in FIG. 6A and other distributions discussed herein are depicted as having finite dimensions.

Additionally, it should be noted that, for the reported aircraft position 310, a probability distribution exists (but for simplicity is not drawn) in the left-to-right axis in FIG. 6A. Likewise, a probability distribution may also be determined in accordance with the present invention for the altitude of the reported position 310. In the present example, if the reported aircraft location 310 is near the left or right edge of the region of interest 410 then the probability that the actual location of the aircraft is outside the region of interest 410 to the left or to the right will be non-negligible and would need to be taken into account.

In the present exemplary embodiment, where the region of interest 410 is an area around, and extending along, the runway 335, the boundaries of the region of interest based on the ends of the runway will typically be far from the reported position 310 of the vehicle in question. Thus, the probability that the actual position of the vehicle is to the left or right of the region of interest 410 can be ignored in many instances. In FIG. 6A, for example, the reported position 310 is slightly to the left of the taxiway 320. However, if desired, the error distributions for a reported aircraft location along any desired axis may be calculated and utilized to determine the probability that the actual position of an aircraft is within a region of interest.

Figure 6B:
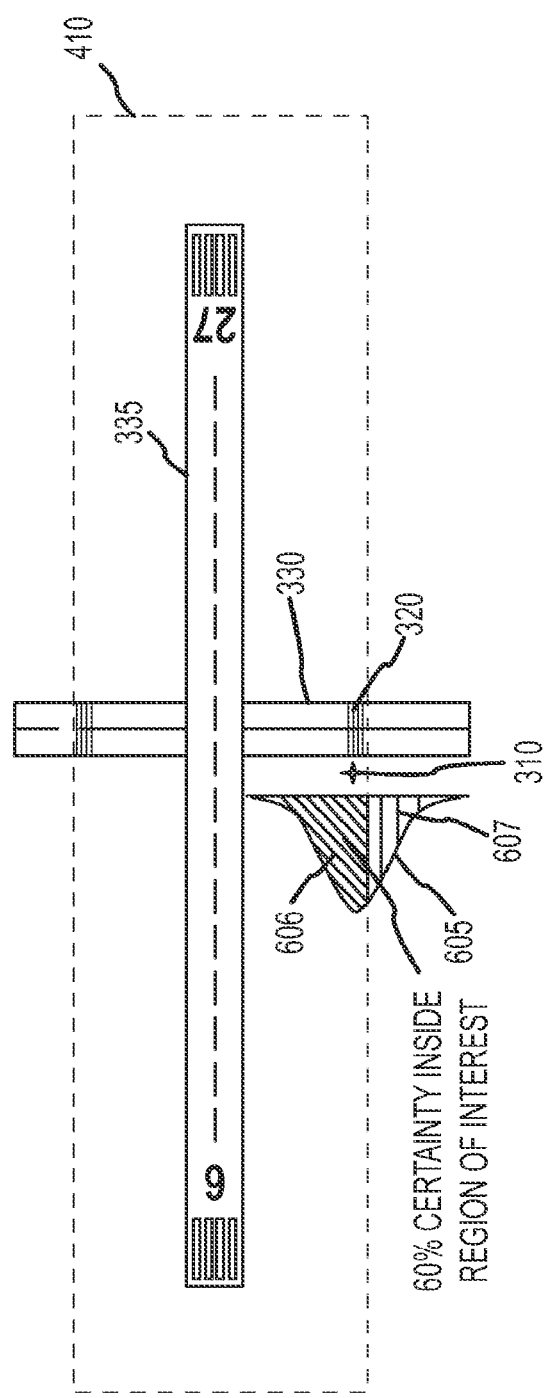

Referring now to FIG. 6B, the reported aircraft position 310 has moved from on the boundary of the region of interest 410 (as shown in FIG. 6A) to inside the region of interest 410. Based on the reported position 310 in FIG. 6B, there is now a 60% probability the aircraft is actually inside the region of interest 410 (represented by shaded portion 606 of the curve 605) and a 40% probability that the actual position is beyond the region of interest (represented by shaded portion 607 of the curve 605).

In accordance with the present invention, a determination is made as to whether a threat of collision between the vehicle and another object exists (230). This determination can be made based on the reported position of an object and/or the probability that the actual position of the object is within another region of interest (220). For example, where the reported position of a second aircraft indicates that it is occupying or utilizing the runway 335, and for an alerting system where it is desired that an alert is generated where there is at least a 60% probability that an aircraft is over the hold line 320, it would be appropriate to issue such an alert for the reported aircraft position 310 in FIG. 6B. The present invention may be used to determine whether a threat of collision exists between a vehicle and any other object, such as a geographical feature, a structure, or another vehicle.

Figure 6C:
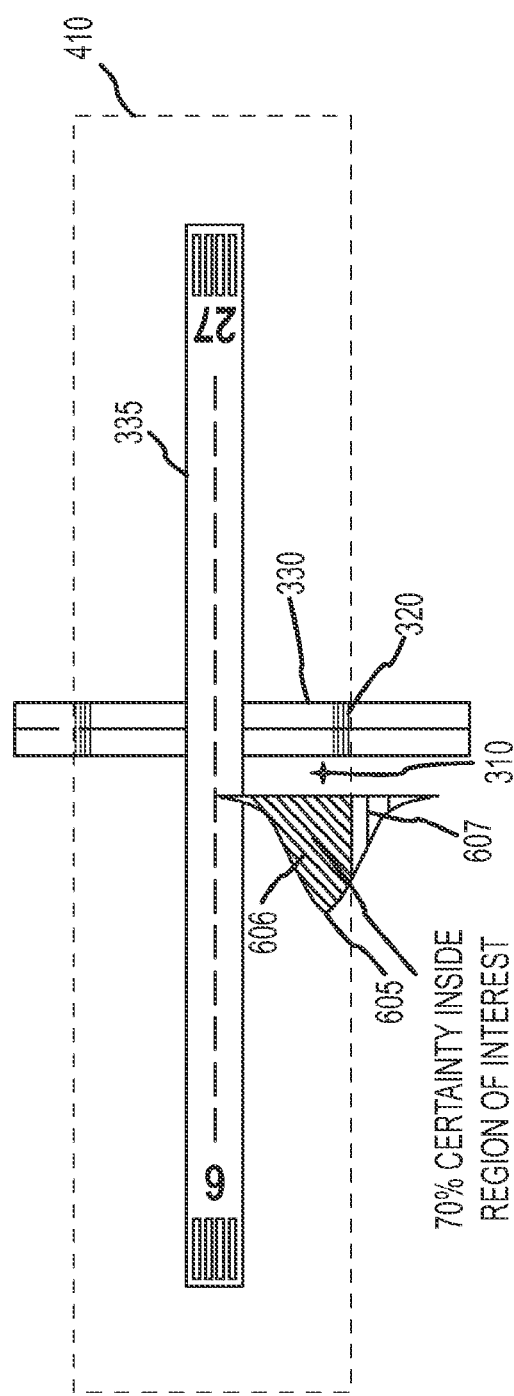
Figure 6D:
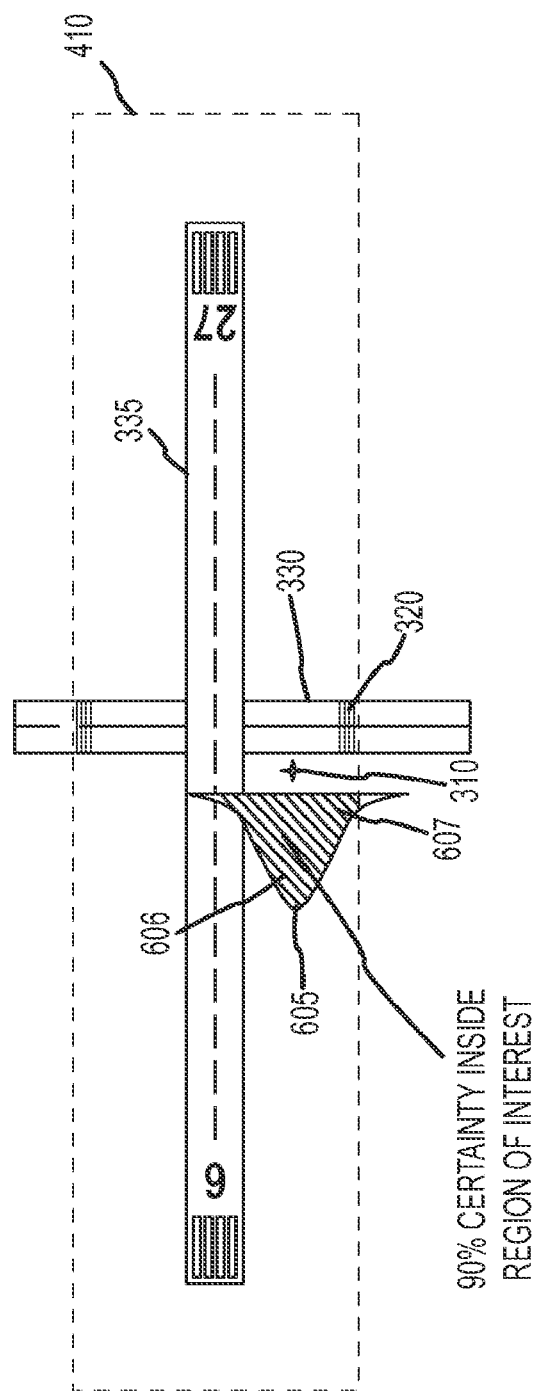
Figure 6E:
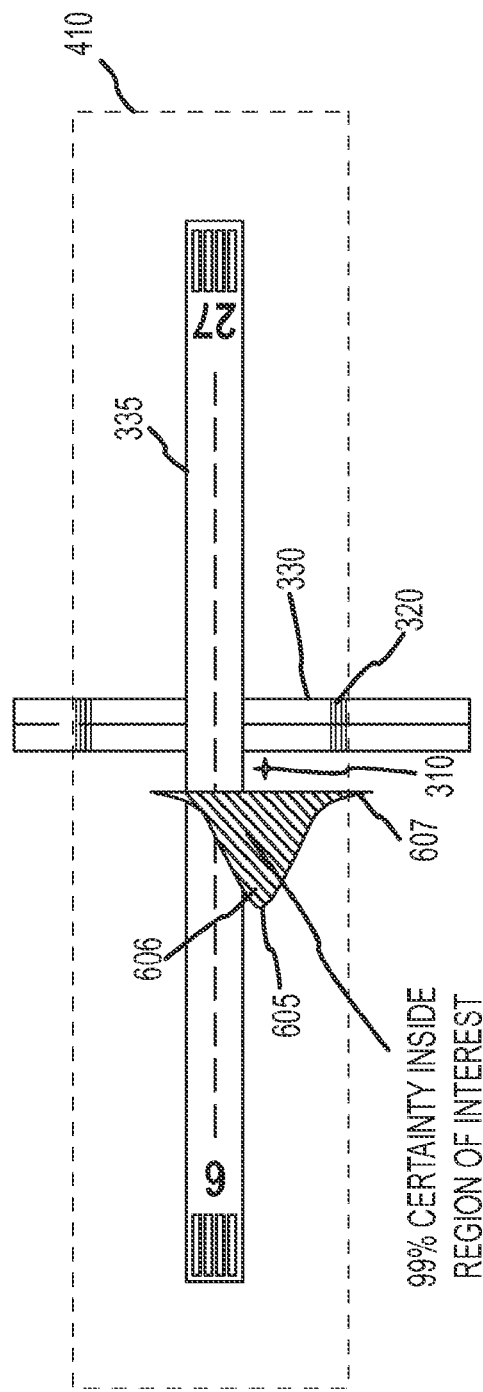

FIGS. 6C-6E illustrate how the probability the reported aircraft position 310 is within the region of interest 410 increases as the reported position 310 progresses further along the taxiway 330 and farther into the region of interest 410. In FIG. 6C, there is a 70% probability that the actual position of the aircraft is within the region of interest 410, while this probability is 90% and 99%, respectively, for the reported positions 310 in FIGS. 6D and 6E.

The present invention may be used to generate alerts at any desired probability level. If, for example, the requirements of a reporting system operating in conjunction with the present invention stipulated that the system could only provide an incorrect alert once in every 100 scenarios, the reported position 310 in FIG. 6E represents the point where the reported position 310 is far enough into the region of interest 410 to have the required certainty to generate the alert and have the alert be correct 99 times out of 100. By only issuing alerts when the probability that the vehicle is within a region of interest exceeds a predetermined threshold (e.g., 99.5% in FIG. 6E), unnecessary nuisance alerts can be avoided.

While the above examples do not (for the sake of simplicity) take into account other potential sources of error, any other relevant source of error may be considered and/or utilized in calculating the probability that the actual position of the aircraft is within a region of interest 410. Examples of such additional sources of error include: error in the position (or boundary measurement) of the region of interest, error in the reported velocity of the vehicle, data latency (e.g., for the reported position), and/or hardware and software errors. Additionally, the probability that a vehicle (and/or object) is within a region of interest may also be based on one or more of: a Global Positioning System Horizontal Figure of Merit (HFOM), a Global Positioning System Horizontal Integrity Limit (HIL), a Navigation Accuracy Category for Position ($NAC_p$), a Navigation Integrity Code (NIC), and a Surveillance Integrity Limit (SIL).

Figure 7:
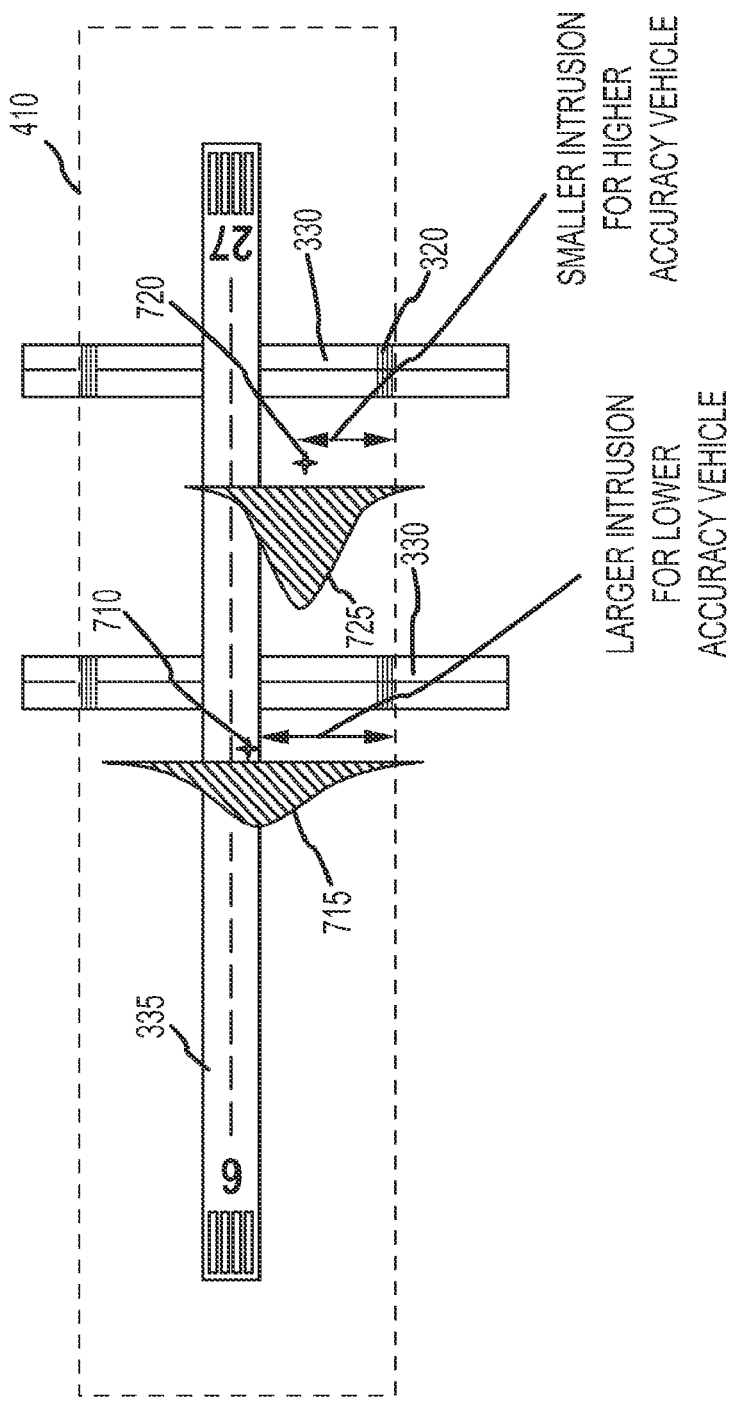
FIG. 7 illustrates accuracy levels associated with reported positions for two separate aircraft.

Systems and methods of the present invention may be used in conjunction with any number of different vehicles. FIG. 7, for example, depicts two different reported positions (710 and 720) for two different aircraft, each with a different estimated accuracy (715 and 725). The reported position 710 and position error distribution 715 has a relatively low accuracy level, while the reported position 720 and position error distribution 725 has a relatively high accuracy level.

Both reported positions 710, 720 have entered into the region of interest 410 to the point where there is a 99% probability that the actual position of the respective aircraft is within the region of interest 410. The actual position of the aircraft associated with reported position 720 and error distribution 725, having a higher accuracy level, could correctly be detected as being in the region of interest 410 sooner than the aircraft associated with reported position 710 and error distribution 715.

This illustrates one of the advantages of one of the preferred embodiments of the present invention. Namely, that an aircraft with a higher accuracy position can benefit from a higher level of protection without causing nuisance alerts to be triggered by aircraft with lower accuracy positions. Another advantage of the present invention is that no updates (whether software or hardware) would be required to an alerting system operating in conjunction with the present invention as navigation accuracy improves over time. Such a system would automatically generate necessary alerts sooner during an actual incursion while still not exceeding the allowable nuisance alert rate. In contrast, conventional systems that use a fixed offset (such as 50 ft) might need to be updated to a new value (such as 20 ft) at some future point in time when a given fleet of aircraft have better navigation accuracy.

Figure 8:
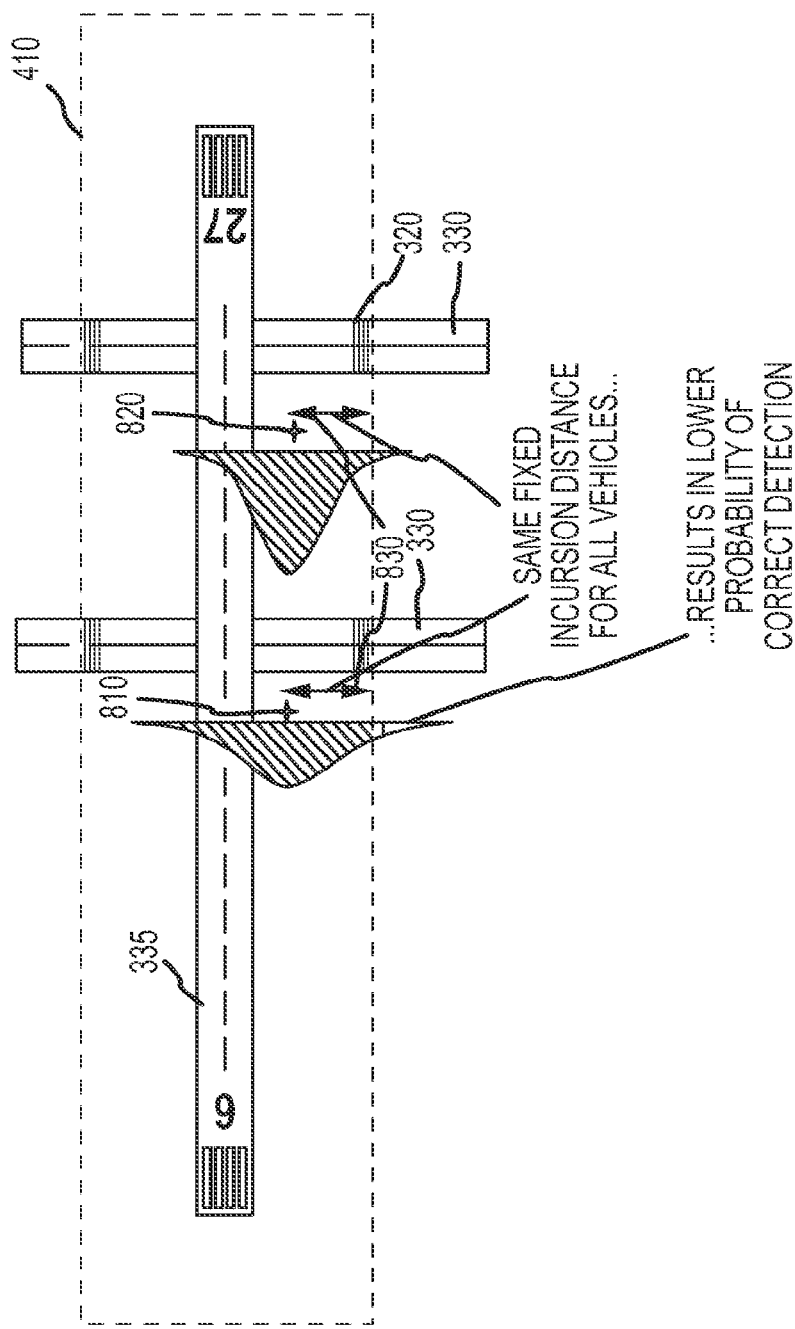
FIG. 8 depicts the use of a fixed incursion distance for two vehicles having differing levels of reported position accuracy.

FIG. 8 depicts the operation of a conventional system that might detect an incursion based on the reported position being a fixed distance 830 into a region of interest. In this example, while the high accuracy of the reported position 820 provides an acceptable level of certainty that the actual position is within the region of interest 410, the lower accuracy of the reported position 810 does not provide that same level of certainty. In other words, the actual position of the vehicle associated with reported position 810 more likely to be outside of the region of interest 410, and thus any alert generated is more likely to be incorrect. In practice, conventional systems have increased the size of the required fixed distance for all aircraft in order to reduce nuisance alerts. This has the effect of unnecessarily putting an aircraft with a higher position accuracy at risk unnecessarily.

Figure 9A:
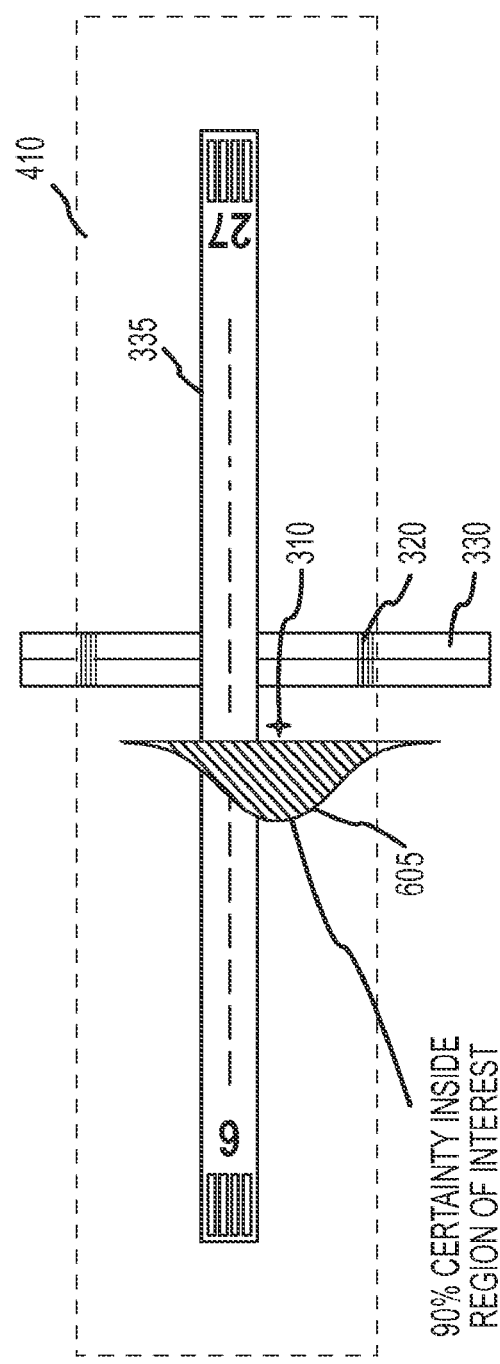
FIGS. 9A and 9B illustrate the probability the actual position of an aircraft is within a region of interest based on different reported positions of the aircraft in accordance with the present invention.

The present invention may operate in conjunction with reported vehicle positions having any level of accuracy. In FIG. 9A, for example, accuracy of the reported aircraft position 310 is relatively lower (as seen by the flatter error distribution curve 605) than the accuracy level of the reported position 310 in FIGS. 6A-6E. The reported position 310 in FIG. 9A represents the point where there is a 90% probability that the actual position of the aircraft is within the region of interest 410.

Figure 9B:
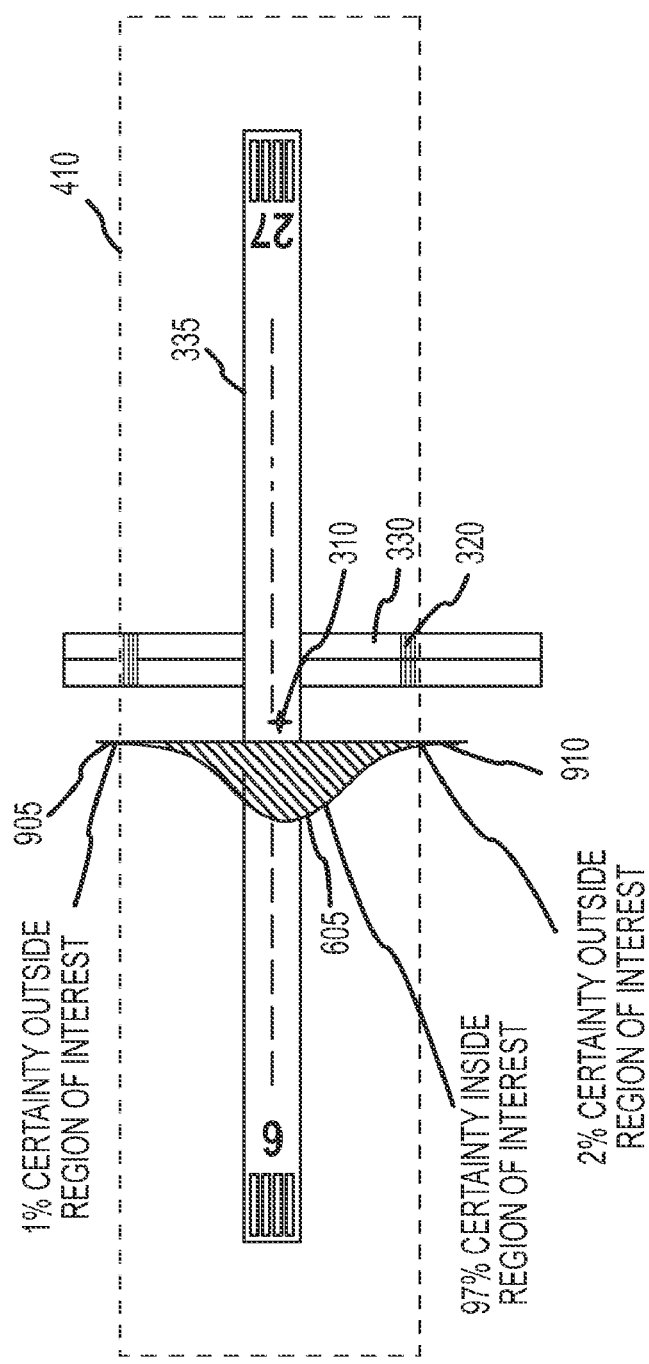

FIG. 9B shows the aircraft in FIG. 9A after it has progressed further onto the runway 335. Note that, in contrast to previous examples, the top "tail" (905) of the distribution 605 is no longer negligible. There is now a finite (1%) probability that the actual aircraft position could be above the top of the region of interest 410. Likewise, the bottom tail (910) extends below the bottom of the region of interest 410, and there is a finite (2%) probability that the actual aircraft position is below the bottom of the region of interest 410. This represents a case where the accuracy of the reported position is insufficient to allow a determination to be made that the aircraft is within the region of interest 410 to a certainty of 99%, using reported position information alone. In such cases, the present invention may utilize other factors, such as reported aircraft velocity or reported aircraft heading, to help ascertain whether the aircraft is on the runway or not.

Systems and methods of the present invention may utilize information regarding geographical features to help determine the probability that the actual position of a vehicle or other object is within a region of interest. In this context, a "geographical feature" refers to any man-made or natural feature. Information regarding geographical features, as with other information utilized by the present invention, may be stored by systems and devices acting in accordance with the present invention and/or may be provided from any suitable data source. In one exemplary embodiment of the present invention, the geographical features of (and surrounding) an airport (e.g. —runways, hold lines, terminals, structures, and undeveloped land) can be correlated with a reported position to verify that the reported position for the aircraft is on valid terrain, such as a runway, taxiway, ramp, gate, or other valid airport surface. If the reported position puts the aircraft on an invalid surface (such as in a swamp next to the airport), the position can be re-evaluated to determine a valid position for the aircraft, and the probability that the aircraft is within a region of interest modified accordingly.

The present invention may consider, in determining whether a threat of collision exists (230) between a vehicle and another object, the reported velocity of the vehicle and/or object, as well as an estimation of accuracy for such reported velocities. Additionally, the present invention may base the determination as to whether a threat of collision exists between a vehicle and object on, among other things, the distance between the vehicle and/or object and the point of closest approach between the two, as well as an estimated time until the vehicle and/or object are expected to reach the point of closest approach.

Just as the reported position of a vehicle is used to calculate a probability that the actual position of the vehicle is within a region of interest, a probability that the actual position of another object (such as a second vehicle) is within another (or the same) region of interest can be calculated based on the reported position of the object. Both probabilities can then be used in determining whether a threat of collision exists between the aircraft and the object. For example, where it is determined (as described above for FIG. 6E) that there is a 99.5% probability that an aircraft on the taxiway 330 is past the hold line 320, and where it is likewise determined that, based on another region of interest (not shown), there is a 99.5% probability that a second aircraft is on (or about to land on) the runway 335, a system configured to only provide an incorrect alert once in every 100 scenarios would issue an alert that a collision threat exists. As with the region of interest 410 described above, a second region of interest may likewise be of any size, shape, and configuration. Any number of regions of interest may be used in conjunction with the present invention, and multiple regions of interest may be separate, or may overlap as desired.

If it is determined that a threat of collision exists between a vehicle and an object, any form of alert can be issued to any desired entity. For example, the alert may include a visual and/or audible alert issued to an operator of the vehicle, and/or an individual external to the vehicle (such as an air traffic controller). The present invention can reduce nuisance alerts by delaying the alert until a higher level of certainty is reached, for instance 99.999%. This would result in a nuisance alert in only 1 out of 100,000 runway operations, which might be only once in a professional pilot's entire career. The reduction of nuisance alerts by the present invention renders alert systems more trustworthy. By contrast, where a pilot has been fooled by a conventional alerting system that "cries wolf" too often he or she will be less likely to react quickly on that very rare occurrence when a runway incursion does in fact occur and the system generates a valid alert.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method comprising:
  a processor executing instructions stored in a memory and thereby performing a method comprising:
    receiving a reported position of a vehicle, wherein the reported position of the vehicle comprises at least one of an Automatic Dependent System Broadcast) ADS-B transmission and a Global Positioning Systems (GPS) transmission,
    calculating, based on the reported position of the vehicle, a probability that an actual position of the vehicle is within a region of interest, wherein the calculating comprises using at least one of, a GPS Horizontal Figure of Merit (HFOM), a GPS Horizontal Integrity Limit (HIL), a Navigation Accuracy Category for Position ($NAC_p$), a Navigation Integrity Code (NIC), and a Surveillance Integrity Limit (SIL);
    determining whether a threat of a collision exists between the vehicle and an object based on:
      the probability that the actual position of the vehicle is within the region of interest; and
      a reported position of the object; and generating an alert if it is determined a threat of a collision exists between the vehicle and the object.

2. The method of claim 1, wherein the object includes one or more of: a geographical feature; a structure; and a second vehicle.

3. The method of claim 1, wherein the region of interest includes a possible future position of the vehicle.

4. The method of claim 1, wherein region of interest includes a possible past position of the vehicle.

5. The method of claim 1, wherein the region of interest includes a possible course of travel for the vehicle.

6. The method of claim 1, wherein the region of interest is bounded by at least one dimension measured from at least one of: a distance from the vehicle; a distance from a surface on which the vehicle is traveling; a distance from a marking; a distance from a geographical location; a distance from a second vehicle; a distance from a structure; and combinations thereof.

7. The method of claim 1, wherein calculating the probability that the actual position of the vehicle is within the region of interest is further based on an estimation of accuracy of a boundary of the region of interest.

8. The method of claim 1, wherein calculating the probability that the actual position of the vehicle is within the region of interest is further based on an estimation of accuracy for the reported position of the vehicle.

9. The method of claim 1, wherein calculating the probability that the actual position of the vehicle is within the region of interest is further based on a statistical distribution of position errors.

10. The method of claim 1, wherein calculating the probability that the actual position of the vehicle is within the region of interest is further based on a reported velocity of the vehicle.

11. The method of claim 10, wherein calculating the probability that the actual position of the vehicle is within the region of interest is further based on an estimation of accuracy for the reported velocity of the vehicle.

12. The method of claim 1, wherein determining whether the threat of a collision exists between the vehicle and an object is further based on a reported velocity of the vehicle and a reported velocity of the object.

13. The method of claim 12, wherein determining whether the threat of a collision exists between the vehicle and an object is further based on: an estimation of accuracy for the reported velocity of the vehicle; and an estimation of accuracy for the reported velocity of the object.

14. The method of claim 1, wherein determining whether a threat of a collision exists between the vehicle and an object is further based on at least one of: a distance between the vehicle and a point of closest approach; a distance between the object and the point of closest approach; and an estimated time until one or more of the vehicle and the object are expected to reach the point of closest approach.

15. The method of claim 1, wherein determining whether a threat of a collision exists between the vehicle and the object is based on whether the probability that the actual position of the vehicle is within the region of interest exceeds a predetermined threshold.

16. The method of claim 1, wherein generating the alert comprises controlling an output device to transmit the alert to an individual external to the vehicle.

17. The method of claim 1, further comprising receiving the reported position of the object, wherein the reported position of the object comprises a GPS transmission.

18. The method of claim 1, further comprising receiving the reported position of the object, wherein the reported position of the object comprises an ADS-B transmission.

19. The method of claim 1, further comprising calculating, based on the reported position of the object, a probability that an actual position of the object is within a second region of interest, wherein determining whether a threat of a collision exists between the vehicle and the object is further based on the probability that the object is within the second region of interest.

20. The method of claim 19, wherein the region of interest at least partially overlaps the second region of interest.

21. The method of claim 19, wherein the calculating the probability that the actual position of the object is within the second region of interest comprises using at least one of: the HFOM, the HIL, the $NAC_p$, the NIC, and the SIL.

* * * * *